March 26, 1968     T. GUILLERM     3,374,872
APPARATUS FOR AUTOMATICALLY CONTROLLING ADMISSION
TO THEATERS AND THE LIKE
Filed July 28, 1966     7 Sheets-Sheet 1

INVENTOR:
THEOPHILE GUILLERM
BY Kurt Kelman
AGENT

United States Patent Office

3,374,872
Patented Mar. 26, 1968

1

3,374,872
APPARATUS FOR AUTOMATICALLY CONTROLLING ADMISSION TO THEATERS AND THE LIKE
Theophile Guillerm, Cinema de Francais, 22 Cotes-du-Nord, Lannion, France
Filed July 28, 1966, Ser. No. 568,575
6 Claims. (Cl. 194—10)

ABSTRACT OF THE DISCLOSURE

A housing at the entrance to a theater encloses a money handling device which counts and collects money introduced into the housing, gives change, and collects tokens. A ticket distributing device in the housing discharges tickets, and a token distributing device discharges tokens. The passing of a person past the housing is sensed. The several devices are connected with each other and an alarm by an electronic circuit so that the alarm is energized by the sensed passing of a person in one direction unless the alarm is inactivated by the collecting of money and the subsequent automatic delivery of a ticket, or by the collecting of a token. A token is discharged when the passage of a person in the opposite direction is sensed.

---

The present invention relates to apparatus for automatically controlling admission with prepayment or other evidence of right of entry into public places such as theaters which charge a price of admission.

In practice the collection of the price of admission at theaters, for example, requires one or more box offices where the admission tickets are sold as well as one or more control stations for collecting the tickets after which an usher indicates the seat which the spectator has purchased.

In relatively large theaters, particularly during busy rush hours, the number of box offices as well as the number of control stations for receiving the tickets must be multiplied so as to facilitate the admission of the spectators and avoid long waiting lines which are more or less stationary, but considerable labor costs are involved in the payment of the additional personnel required for such operations.

Even if the personnel is limited, the actual organizing of the payment for admission unavoidably requires considerable cost and increases the costs involved in the operation of the theater or other analogous public place. Various attempts have been made in recent years to improve these conditions under which theaters are operated as well as to reduce the costs resulting from the requirement of having on hand the personnel necessary for the distribution of tickets as well as for controlling entry into the theater. Among others, there is an automatic system of control of admission with prepayment, with or without temporary exemptions, disclosed in French Patent 1,298,440, dated May 23, 1961.

The present invention deals with an apparatus which will improve considerably, as compared to known systems, the prevailing conditions while at the same time doing away with any solid barriers or the like which resist admission, whether such barriers are movable or disappearing, the apparatus of the invention making it necessary for the spectators to make a payment for the right of admission while at the same time effectively controlling without any possible error admission into the theater or the like.

2

One object of the present invention is to provide an apparatus which enables a considerable reduction in the operating costs to be achieved while at the same time improving the conditions of control, of accounting and of entry, without imposing any additional constraints on the use of the apparatus.

A further object of the present invention is to provide such an apparatus with a means which will permit the spectators to enter by themselves, without any visual or manual control and to choose a place which suits them best for viewing the performance.

A further object of the present invention is to provide an apparatus of this type with a means which will permit the spectators to leave the theater at any moment and in particular during between-the-act intermissions and to be readmitted into the theater without a second payment.

Yet another object of the present invention is to provide an apparatus of this type with a money-handling means which will enable those spectators which do not possess the precise exact coins necessary for the price of admission to receive the admission ticket and at the same time to receive change for money introduced into the apparatus of the invention.

Still another object of the present invention is to provide a construction according to which the passage of spectators is brought about without placing in the path of the spectators any solid barrier of any type, including any solid selecting switch or the like which controls the admission of the spectators into the theater.

The objects of the present invention also include the provision of a non-solid device acting as a barrier against fraudulent admission into the theater, this non-solid barrier being invisible and providing absolutely no restraint on the clothing, particularly of female spectators, such as dresses, coats, or the like which can, for example, be damaged by catching on gates, hooks or chains which form barriers, turnstiles, and similar devices which are actually used in conventional apparatus of the above type.

It is also an object of the present invention to provide an apparatus which will give absolutely no obstacle to rapid evacuation of the theater when necessary, this rapid emptying of the theater being capable of being provided without any hindrance since the passage for entering or leaving provided for the spectators is always free of any solid obstacle of any type.

One of the characteristics of the present invention is that the apparatus is provided in a single unitary form without any accessory units or devices and that in order for operation of the device it is only necessary to have a single connection to a source of power providing the required electrical current.

A further characteristic of the structure of the invention is that means are provided for rendering the apparatus transportable so that it can be situated at any location in the theater where spectators are admitted, for example, and on the other hand the apparatus can be arranged in groups in a series so that their position can be changed at any desired moment.

A further characteristic of the present invention resides in the provision of a passage, for the spectators, having absolutely no door or barrier to access which is immovable or removable so as to not to provoke any resistance in the continuous flow of a file of spectators desiring admission to the theater.

Yet another characteristic of the invention resides in providing an apparatus which is easily removable and situated on wheels so as to fulfill the statutory safety regulations which are in force for theaters.

The apparatus which is the object of the present invention includes five primary assemblies which are united into a single unit, these primary assemblies being:

(1) The device itself, including an outer housing which also forms a cover for the apparatus;

(2) The money-handling means which acts to receive, count, and give change for money whenever necessary, while at the same time being capable of receiving tokens during between-the-act intermission;

(3) A ticket-distributing means which also removes and registers tabs of the tickets;

(4) A token distributing means to provide tokens for between-the-act intermissions or other premature departures from the theater, and (5) An electronic means which enables all of the required operations of the various money-handling and ticket distributing as well as token distributing systems to be carried out.

The apparatus is designed so as to be on the one hand of a pleasing aesthetic appearance while at the same time being adapted to receive means for transportation such as a system for raising the entire apparatus, and in addition the apparatus is provided with a slidable rail means which will define a passage for the spectators as well as with distributing systems of the type referred to above, and of course also the electronic means. The apparatus takes the form of a block-shaped cabinet having at the top and at each end cut-away corners for receiving printed signs of instruction which can be illuminated, as well as for receiving various doors, covers, and supports in the form of suitable shelves or the like to receive the distributing apparatus and the control apparatus, the apparatus including also different coin chutes and the like for directing the money into a suitable till as well as for directing tokens, and in addition various channels, slots, and the like providing for distributing money and admission tickets. On the housing of the apparatus there is mounted a slidable rail means which in its position of operation is displaced away from the housing so as to define therewith a passage for the spectators between the housing and the shiftable rail means. The means for raising the apparatus is fixed to the bottom of the cabinet and can take the form of longitudinally extending plates on hinges carrying rollers, each plate being actuated by a jack or screw which permits ultimate transportation of the cabinet. When the wheels are retracted, the cabinet is lowered and rests against the floor and is in the position of operation, which provides the apparatus with a stability and resistance to pushing to which it will be subjected by spectators who are to come, this apparatus of the invention in addition being provided with openings for photosensitive resistors and infrared lamps which enable the control of the payment and admission of the spectators who have paid the price of admission. The money-handling systems includes coin-operated switches, coin-channels or slots, a means for directing coins into the till once the proper control has been initiated, so that admission can take place. This money-handling system controlled by the coins provides the impulses required for the different control relays, on the one hand, the ticket-distributing structure and, on the other hand, the electronic system required for opening the passage at each payment. It is constructed in such a way that at each payment in response to the impulse received a ticket is delivered, the tab having been preliminarily detached from the ticket and remaining in reserve, and then the operation of the device automatically terminates.

The electronic system includes a group of photosensitive resistors forming cells which are placed at an elevation of the cabinet in suitable openings provided for this purpose which are respectively aligned with infrared lamps placed also in openings of the railing at the other side of the passage for the spectators, the transistor apparatus actuating relays which receive and respond to different impulses provided either by the various coin-operated switches or by the photosensitive resistors situated at a suitable elevation.

The apparatus is opened in order to be placed in an operative position, which is to say the railing is shifted away from the housing of the apparatus to provide the passage of admission, and at the same time the wheels or rollers on which the apparatus rests during transportation thereof are retracted and the apparatus is connected to a suitable source of power and placed in operation.

The price of admission is determined by an electronic selecting arrangement and a simple button enables changes to be made in the price of seats which are indicated on the printed luminous signs which are placed at the inclined corners at the upper end of the cabinet, at the admission side thereof. Another luminous sign of instructions is placed on an inclined corner of the cabinet which is situated at the departure side, these two inclined panels providing a green continuous signal indicating that the device is free and in operation and providing a blinking red signal indicating that the device is operating but occupied. When the apparatus gives the green signal, indicating that it is free, one can either enter or leave without any manipulations if no payment is required for admission. When the first piece of money is introduced, the blinking red signal, at the departure side, is released and indicates that the apparatus is occupied. The last piece of money brings about release of a mechanism which through suitable relays provides an impulse to a ticket distributor which delivers immediately an admission ticket from which a tab has been removed and placed in reserve, the cutting off of supply of power to an indicating alarm system which functions as a non-solid barrier to release the blinking red signal at the entry side, indicating that the green signal should be waited for until a new payment is made and closing the coin-receiving gaps, such as slots, channels, and the like, so as to avoid in any manner a new payment before the green lamp indicates that the receiving system for receiving the money is in a condition for receiving the next payment.

A non-solid barrier thus being open, an individual can pass and, by operation of the cells in cascade, this individual will establish behind himself, to the extent of passage of the individual through the apparatus, an immediate alarm circuit which will render impossible passage of a second individual for the same price of admission.

The apparatus is constructed in such a way that it will not inhibit passage of persons of large proportions or of excessively thin individuals, and in addition fraudulent entry of more than one individual, such as a pair of relatively thin individuals acting as a single individual is prevented with the apparatus of the invention. In order to avoid such a pair of individuals from entering for a single purchase price, the apparatus of the invention is provided with an automatic informer taking the form of a foot counter capable of counting the number of feet which pass through the apparatus. In operation a given number of feet, three or four, for example, releases an alarm. The passage of a person into the apparatus after payment provides also direction of the coins into the till and re-establishes the green light corresponding to the free state of the apparatus, indicating that it is ready for use. As soon as a person enters into the passage for the purpose of departing, the blinking red signal is released at the two panels at the two ends of the cabinet, indicating that one should wait for the green signal before making a payment at the entrance side, and to avoid engaging anybody at the departure side. As soon as a person has passed through the apparatus the green lamp is re-ignited, indicating that the apparatus is free. The fact that each individual leaving must wait for the green lamp to be illuminated, provides between two individuals who follow one another a minimum distance which can be fixed at the neighborhood of 80 cm., this distance under all circumstances corresponding to the normal distance between two individuals who follow one another without provoking any mutual resistance. Each passage will release the ejection without any manipulation, of a token which will serve for readmission without a second payment, particularly at theaters where individual performances are made with between-the-act intermissions and where actual exit vouchers are distributed. The giving of the tokens is brought about by a column of the coins which eject at each impulse from a given passage the first token from the bottom of the column.

It is, of course, necessary that in the case where the price is not a round number, it should be simple to give change so as to accept a number of small coins and in this case it is sufficient if the entrance passage utilizing a system for distributing tokens situated preferably to return change through the same slot as the ticket, the difference being that instead of a control in response to the passage of the individual in the direction of departure (as in the distribution of tokens), the change is given in connection with the distribution of tickets, which subordinates the giving of change to the payment which is made and to the delivery of a ticket.

On the apparatus, the illuminated instruction signs are provided at the entrance side, with arrows indicating the gaps for receiving the money, the gaps for the tokens, the price of the seat, the number of coins to introduce, and if required, the change for the money introduced, the counting of the coins in the form of a given number which illuminates each coin introduced. The luminous instruction signs also are provided with two lamps, a continuous green and a blinking red. The panel at the side of departure has only a continuous green lamp, indicating that the apparatus is free for operation, and a blinking red lamp, indicating that the apparatus is occupied. These signs at the extremities of the apparatus can also include different inscriptions giving information to the spectator as to the different steps to be followed in carrying out the necessary operations for admission and departure.

In the interior of the cabinet, the ticket-distributing means includes a pair of motors which simultaneously actuate cutting blades for cutting the tabs from the tickets, for separating the tickets one from the next, and for finally advancing each ticket when a payment has been made by an individual desiring admission into the theater.

In the ticket-distributing means, the actual tickets which are used are in the form of head-to-foot tickets where the removable tabs are situated next to each other between a pair of successive tickets, and the device of the invention will provide the necessary cutting through of such tickets.

The tickets are cut between a movable blade and a stationary blade, and some cams are fixed on a shaft carrying the movable blades and actuating the switches which are connected in the circuit of a driving motor. The displacement of a ticket onto a cutting plate is brought about by means of a claw provided with a spring which maintains the claw in engagement with the ticket, this claw being driven back and forth by a system of levers driven by a motor. During one stroke the claw is retracted and enters into a pair of small openings provided for the purpose in the ticket and during the second stroke the claw feeds the ticket to the cutting position.

The versatility and efficiency of the apparatus permits any manipulation, such as successive admissions after having paid the price of admission or departures, in which case, a token is systematically delivered to permit re-entry without a second payment. In the position of operation, there is a closed barrier, in the instant case invisible and taking the form simply of a signal which gives an alarm such as a sound in the event that there is an attempted passage without payment, the alarm being capable of taking a number of different forms such as that which has been described in the patent of addition No. 83,355 of June 22, 1964 to the French Patent No. 1,298,440.

It is to be noted that even if someone succeeds in passing through the apparatus without paying and attempts to escape by becoming lost in the theater, it is still possible to find such an individual because he is not in possession of a ticket showing good faith payment of the price of entry, inasmuch as the apparatus did not deliver a ticket showing evidence of payment of the price of admission.

The electronic control system is made up of a group of photosensitive resistors in the form of cells placed at a suitable elevation in the cabinet in openings provided for this purpose and respectively aligned with sources of infrared light placed in openings of the railing, and a transistor apparatus is operatively connected with relays which receive and respond to different impulses derived either from different switches or from the photosensitive resistors.

Other characteristics and advantages of the present invention will appear from the following description taken in connection with the accompanying drawings which form part of this application and which show one possible embodiment in which.

Figure 1:
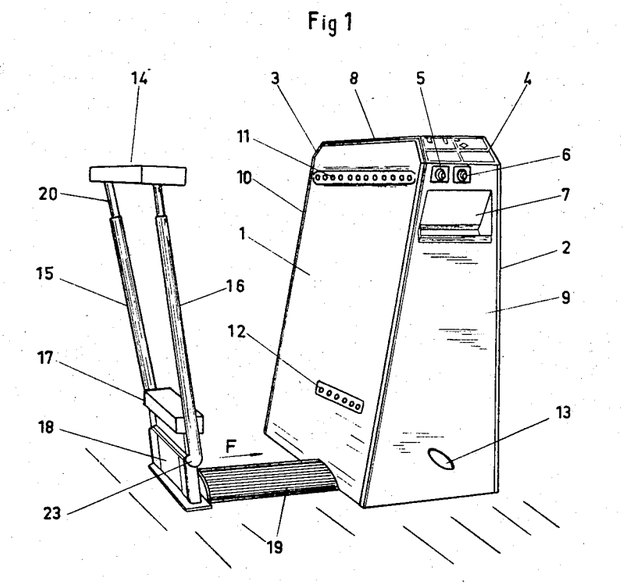
FIG. 1 shows the apparatus in position of operation.
Figure 2:
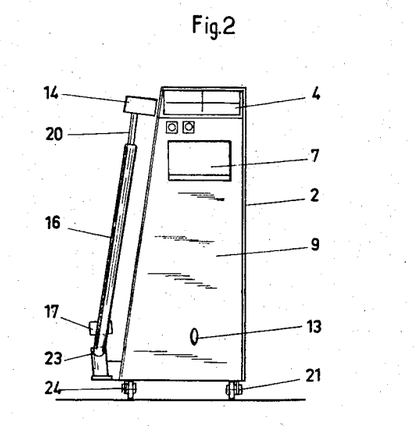
FIG. 2 is a side view of the apparatus in a position of non-use where it is contracted and is ready to be transported.

Referring now to FIGS. 1 and 2, which show the housing and railing means of the apparatus of the invention in open and closed positions, respectively, it will be noted that the housing takes the form of a parallelepiped whose front face 9 and rear face 10 are of trapezoidal configuration, while the side faces 1 and 2 have a rectangular configuration.

The housing includes a top and at each end a cut-away inclined section 3 and 4 which receives the signs of instructions which can be luminous and which indicate the various steps to bring about admission or departure. On the side 2 there are two doors, at the top 8 there is a cover, and at the interior there are suitable shelves or supports or compartments for receiving the various units and devices as well as the electronic control system. At each end there are on the faces 9 and 10 of the housing recesses 7 which extend inwardly toward the interior and have the form of reentry portions for receiving at the entrance end coins for the price of admission or tokens of departure, and at the other end the ticket and finally any change given back.

The slidable ramp is of the same general height as the cabinet and includes a pair of tubular supports 15 and 16 in which a pair of tubes 20 are slidable, the latter supporting the upper railing 14. At the lower part of the railing means is provided a base 18 on which the railing means is supported, and this part of the apparatus is provided with a foot railing 17. The tubes 15 and 16 which form part of the railing means are turnable at 23. The railing means can be displaced away from and retracted back toward the housing by means of a slide member 19 suitably supported at a lower portion of the housing with respect thereto. On the cabinet there is provided a lifting system made up of a pair of longitudinal plates on hinges and each carrying a pair of rollers, these being end rollers 21 and 24 as shown in FIG. 2. The two plates are actuated by a screw or jack, controlled by way of a handle 13 at the lower part of the cabinet, so as to bring about a lowering of the rollers 21 and 24 onto the floor or a raising of the cabinet sufficiently to support it on the rollers. When closing the screw or jack, the housing moves downwardly under its own weight so as to rest against the floor, while the rollers 21 and 24 are retracted. The assembly of this raising means therefore permits to place the apparatus in a position of operation, as shown in FIG. 1, from its position of transportation, as shown in FIG. 2. When the apparatus is in its position of operation it has a stability and resistance to the pushing to which it will be subjected by the spectators. An ornamental plate is provided to form a bridge covering the slide 19, so as to prevent people from bumping into it.

On the railing 14 at the upper part of the railing means and on the side 1 of the cabinet there are openings provided so as to place in alignment the photosensitive resistor cells 11 and, on the railing 14, the infra-red lamps which are respectively aligned with the photosensitive resistors. At the lower part of the cabinet are the openings 12 which receive additional photosensitive cells in the form of photosensitive resistors which are respectively aligned with additional infra-red lamps carried by the lower, foot railing 17. These cells and infra-red lamps at the lower part operate as a foot counting means while the cells and lamps at the upper part act to count the individuals in the region of their shoulders or chests.

On the front face 9 of the apparatus there are indicating lamps or signals including a red signal 5 and a green signal 6. These signals are also provided at the rear face 10.

Figures 3, 3A:
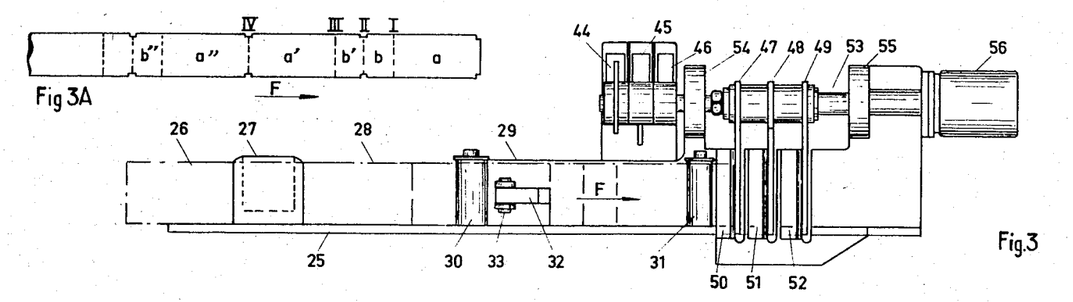
FIG. 3A schematically indicates the actual tickets which are used.
FIG. 3 is a sectional elevation taken along line a—a of FIG. 4 in the direction of the arrows and showing the ticket transporting and cutting structure.
Figure 4:
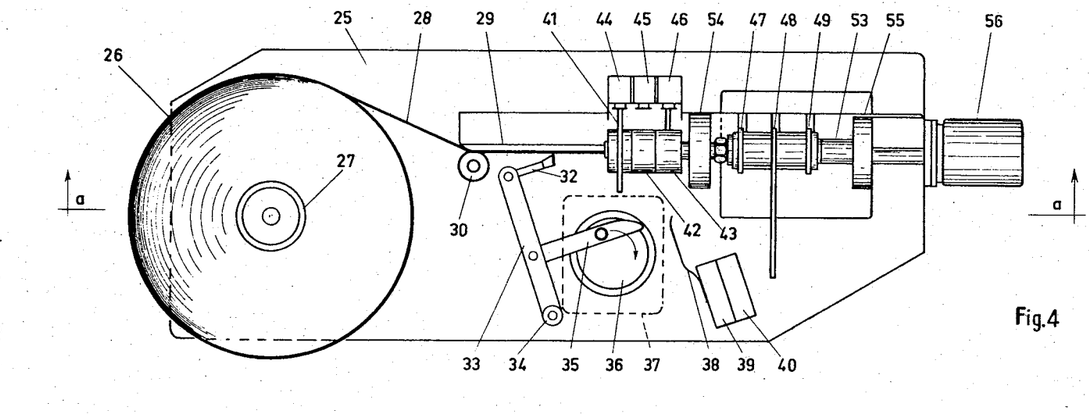
FIG. 4 is a plan view of the ticket-distributing means of FIG. 3.

Referring to FIGS. 3 and 4 which show the means for distributing the tickets, it will be noted that the ticket-distributing means includes a supporting plate 25, two motors 37 (FIG. 4) and 56, for example of the type used for windshield wipers of automobiles, a rotary shaft 53 supported by a pair of ball bearings 54, 55, this shaft 53 being driven by the motor 56. At one end of the shaft 53, the latter fixedly carries cams 41, 42 and 43 provided with suitable camming surfaces such as the camming portion 41. These cams are provided to actuate the switches 44, 45 and 46. On the support plate 25 there is fixedly mounted a pivot 34 which supports for turning movement a lever 33 which carries a claw 32 which serves to advance the tickets 28, a lever 35 being operatively coupled to the lever 33 and to a coupling driven by a motor 37, so that from the motor 37 the claw 32 is actuated for advancing the tickets in a stepwise manner. The lever 35 has a rounded end which can rub against and interrupt the switch 38 controlling a cell 39 which is connected with a cell 40. On the support plate 25 there are also fixed a mounting 27 for the roll 26 of tickets as well as a guide 29 for the tickets, this guide 29 being provided with guide rollers 30 and 31 which permit the tickets to be advanced by the claw 32 to the stationary cutting blades 50, 51 and 52 which will ultimately cut the tickets by cooperation with the blades 47, 48 and 49, respectively.

The arrangement of tickets as actually used is illustrated in FIG. 3A, and this arrangement is head-to-foot arrangement inasmuch as the tabs at the ends of the tickets are arranged next to each other for each pair of successive tickets, thus requiring a special arrangement of the cutting blades 47, 48 and 49, this arrangement being as follows:

(1) Two parallel blades 48 and 49 cooperate with the stationary blades 51 and 52;

(2) At an angle of 120° with respect to the latter blades there is a third blade 47 coacting with the blade 50;

(3) At a further angle of displacement of 120° there is a fourth blade 48' which is integral with the blade 48 and coacts with the blade 51.

The ticket and the tabs to be removed therefrom are always cut between a movable blade and a stationary blade.

The situation of a ticket with respect to the stationary cutting blades 50, 51, 52 is brought about by the claw 32 which is provided with an unillustrated spring which maintains the claw in engagement with the tickets. This claw is moved back and forth by the lever 33 driven by the motor 37. In one stroke the claw 32 is retracted and enters into a pair of small openings provided in the ticket for this purpose while in the second stroke the claw feeds the ticket to the cutting position.

The operation of the ticket distributor includes two distinct movements, a short movement alternating with a long movement as a result of the head-to-foot arrangement of the tickets as actually used.

The short movement takes place in the direction of the arrow F and is brought about by an impulse delivered to the motor 56, the pair of parallel blades 48 and 49 swinging toward the stationary blades 51 and 52 and cutting the ticket a long the lines I and II indicated in FIG. 3A, so as to separate the tab b which falls into a suitable reserve, and the motor 56 stops operating by an interruption brought about by the action of the cams on the switch 46.

Figures 5, 5A:
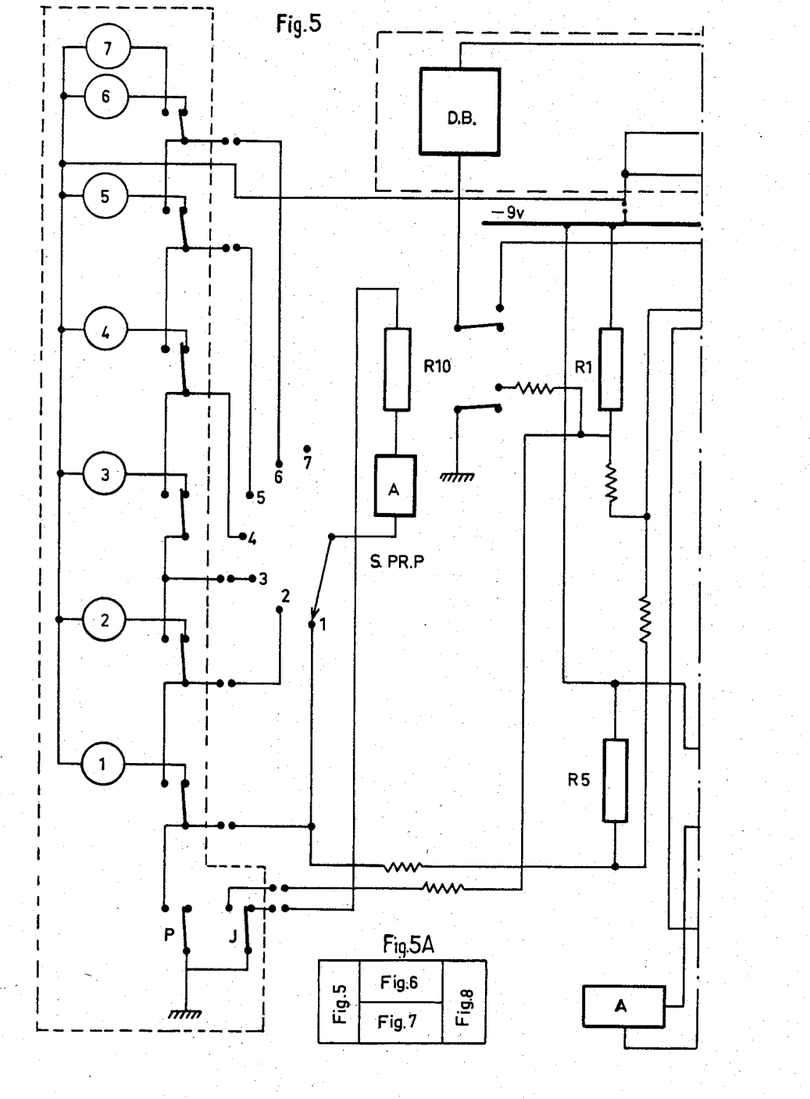
FIGS. 5–8 show details of the wiring diagram or electronic control system of the apparatus.
Figure 6:
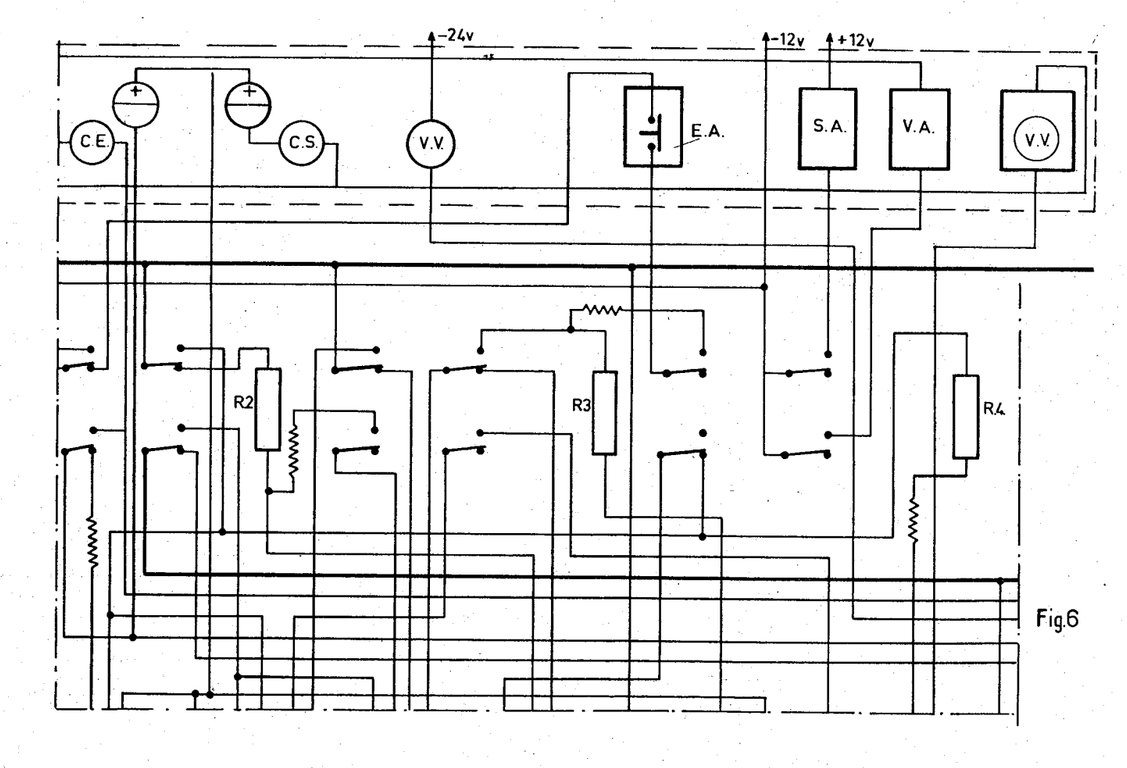
Figure 7:
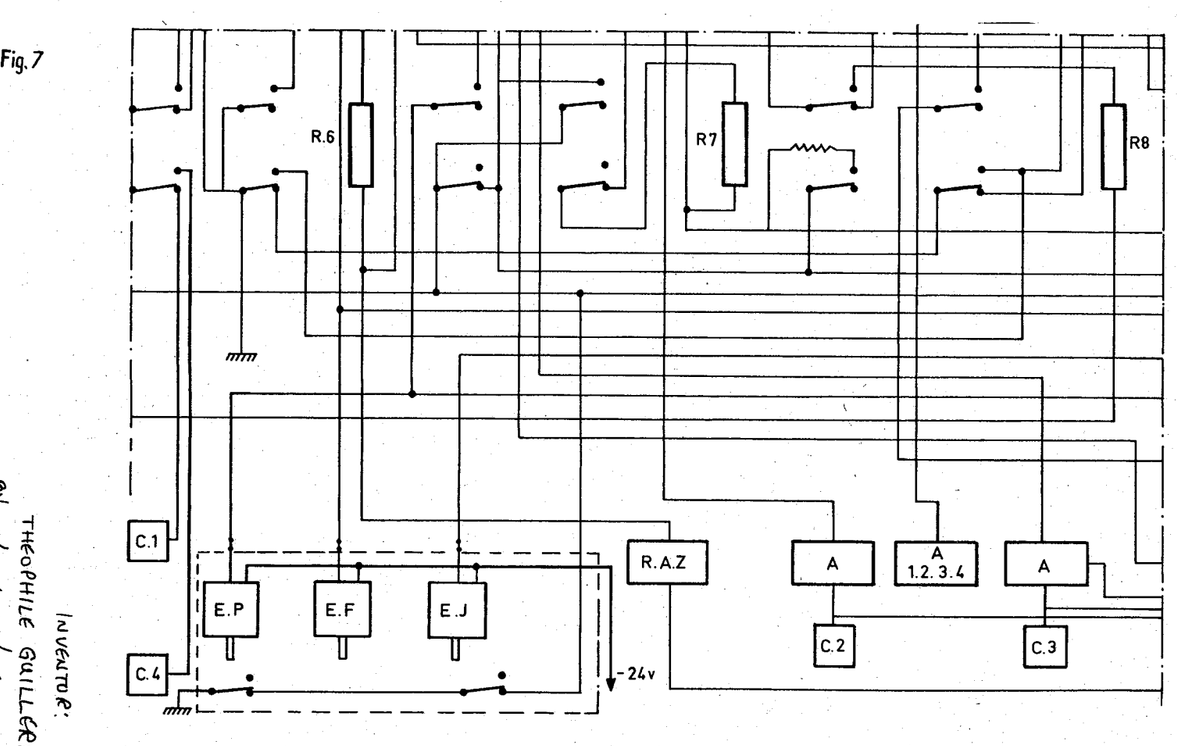
Figure 8:
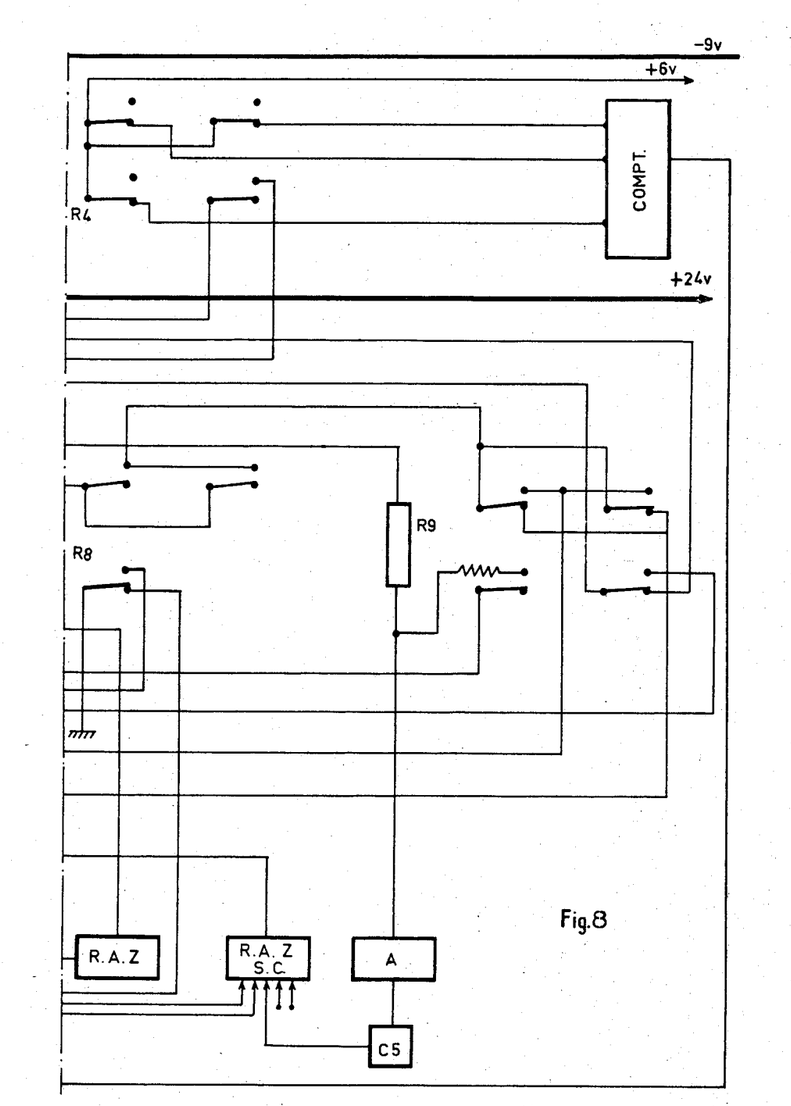

The long movement in the direction of the arrow F is brought about from an impulse delivered to the motor 56 from a switch P (FIG. 5) actuated by a coin guided along the suitable chute or the like, the tab b' in front of the ticket a' being cut at the line III by the blade 47 in cooperation with the stationary blade 50, while when the motor stops the contact is transmitted to the motor 37 by the action of the contact 45 under the control of the camming portion of the ring 42 which acts on the contact 45, at the same time that another cam portion of the ring 43 actuates the switch 46 so as to stop the motor 56. The ticket a' has been placed in a cutting position with respect to the stationary blade 51 by the claw 32 which has been actuated by the motor 37, while the motor 37 stops operating as a result of the action of the end of the lever 35 on the interruptor 38 of the switch 39, the contact 40 actuating the contact 44 which has been itself placed in the circuit at a suitable potential. This part, without rubbing on the switch by the cam 41, having been set free delivers an impulse to the motor 56, the ticket b' is cut at the line IV by the blade 48' coacting with the stationary blade 51, and the switch again transmits an impulse to the motor 37 while the motor 56 stops operating, by the same operations as those referred to above. The camming portion of the ring 42 actuates the switch 45 and places the motor 37 in the circuit while the camming portion of the ring 43 actuates the contact 46 which stops the motor 56, the ticket a" being delivered to the cutting position by the following operation, and the motor 37 stops under the new actuation of the end of the lever 35 on the interruptor 38. The contact or switch 40 has no part in this phase of the operation, being no longer supplied with power by the switch 44 which itself is only connected into the circuit when it engages without rubbing part of the contact of the cam 41, the ticket-distributing means stopping thus until the next operation.

In order to understand the electronic system illustrated in FIGS. 5–8, it is necessary to review the functioning of the apparatus.

The money-handling means includes coin-operated switches, coin-guiding slots and channels, a system for directing coins into a till once a control has been actuated to bring about admission, so that in this way the desired results will be produced. The coin guiding slots and channels include flexible switch contacts actuated by the coins and giving impulses to the various control relays on the one hand, the ticket-distributing means, and, on the other hand, the electronic system provided for opening the passage at each payment. The ticket-distributing means, as has been set forth above, is constituted by a structure which at each payment will receive an impulse to deliver a controlled ticket, the tab of which is retained, and then the apparatus stops the operating cycle.

The apparatus is placed in the position of operation shown in FIG. 1 and the slidable rail means is set up to form the pasage which controls admission into and departure for the theater, the transporting rollers being retracted and the housing being set into operation. The price of admission is determined by an electronic switch arrangement S.P.R.P. (FIG. 5) controlled by a simple button which permits the price of admission to be changed, these prices being indicated at the luminous instruction signs which are situated at the entrance side of the upper inclined corner of the cabinet, an additional instruction sign which is also luminous being placed as described at the other cut-away corner which is situated at the departure side of the apparatus. The two panels give a green signal which is continuous during operation showing that the device is free while a blinking red signal is provided during functioning and occupation of the apparatus. Thus, as soon as there is a green signal, showing that the apparatus is free, it is possible for an individual to enter or depart without any particular manipulations, except for the purpose of paying the price for admission.

The electronic system shown in FIGS. 5–8 includes ten relays controlled by transistor amplifiers which are connected to photoelectric cells on the one hand, or to coin-operated switches on the other hand.

The ten relays correspond to the distinct functions which are: the relay 1 which controls the raising of an alarm, the relay 2 which brings about the placing of the alarm, and the relay 3 which provokes the excitation of the alarm, the relay 4 corresponding to a return to a zero (RAZ) position of the counter. The relay 5 controls admission and departure, while the relay 6 returns the various relays to their initial or zero positions (RAZ), the relay 7 placing the relay 8 in circuit while the relay 8 brings about the return to zero or rest (RAZ) of the entire electronic assembly. The relay 9 brings about excitation of the electro-token (EJ) and the relay 10 brings about excitation of the ticket-distributing means (DB).

In its position of rest, without any excitation of any relays the green lamps (VV) are illuminated as a result of the position of rest of the relays R2 and R9, the openings for the coins P and tokens J being in an open position and the invisible barrier which forms a block to the passage being closed by the rest position of the relay R3. In the position of admission with payment, the admission of the first coin into the slot or channel provided for this purpose brings about by way of the contact 1 the operation of the switch R5 which produces a release of the blinking red signal at the departure side and which removes the green light at the departure side. The last coin, according to the predetermined price of admission for which the selector (S.P.R.P.) is set has actuated a corresponding switch in accordance with the number of coins (MbP) required, the relays R1 and R10 are set into operation, the relay 10 providing an impulse to the ticket-distributing means (DB), and to the change returning means if there is any change to be returned. The relay R1 closes the openings through which the coins are inserted as a result of an impulse given to the electrical gap-controlling structure (EF), while illuminating the blinking red (CE) signal at the entrance side and extinguishing the red lamp at the entrance side and opening the non-solid barrier which forms the block constituted on the one hand by the photoelectric cells on the front face of the cabinet which are aligned respectively with the infra-red lamps carried by the railing means.

After having made his payment, an individual who has paid for admission goes through the passage defined between the housing and railing means so as to bring about without his knowledge the following operations: the cells C1 and C2 used for departure do not react, while the passage in front of the cell C3 brings about the operation of the relay R7 which places at a given potential in the circuit the cell C4 which in turn, as soon as the cell C3 is disconnected, acts in connection with the passage of an individual and places in operation the relay R8 which itself places at a given potential the electromagnet (EJ) provided for directing the coins into the till. When the cell C4 is disconnected, in its turn, the relay R8 returns to its position of rest and thus re-establishes the initial free position and re-establishes the closing of the invisible barrier, returning the green light (VV) and placing in positions of rest the electrically operated openings for the coins (these openings for receiving the coins are again opened), the blinking red signals being extinguished thus placing the apparatus from the occupied position to the free position but requiring a preliminary payment. The relay R8 returns to its position of rest, placing at the same time in the position of rest all of the relays which were excited during the cycle of operations.

When a person departs from the theater his movement before the cell C3 places in operation the relay R7 which in its turn excites the relay R4 which releases the blinking red signals CE and CS and extinguishes the green lights (VV). During movement of the individual in front of the cell C2 provided for departure, the relay R2 is excited, placing at a given potential in the circuit the cell C5 which (corresponding to an informer counts the feet during the entrance operation) this cell C5 in its turn during the passage of an individual placing the relay R9 in operation. This relay R9 places in the circuit at a given potential the relay R8, and after disengagement of the cell C2 and a contact of the cell 1, the relay R8 is placed in operation and actuates the electromagnet (EJ) provided for delivering a token for departure. As soon as an individual has disengaged the cell C1 the apparatus is in a position of rest, the assembly of contacts and relays are reestablished as in the operation of admission, which is to say the blinking red signals CS and CE are extinguished, the green lamps (VV) are illuminated, the invisible barrier is re-established (the photoelectric cells and infra-red lamps of the railings, opening the coin-receiving gaps or token receiving gaps with the relay R9 being in a position of rest) and placing at a position of rest all of the relays which were excited during the previous cycle of operations. There will now be described the different operations which take place upon admission with a token, these tokens being distributed by the apparatus when there is a between-the-act intermission or when there is provision made for departure before the end of the performance. In the position of admission with a token, a switch (J) is situated in a token guide designed to receive the tokens and actuated by a token and releasing the same operations as those which take place upon payment by way of a coin of money. The only difference is that the relay R10 which serves the purpose of delivering an impulse to the ticket-distributing means (DB) will not be excited and will not take part in the operation so that as a result there will not be delivery of any tickets at this time.

In the event that an individual seeks to enter without payment, there is now described the operations which take place during an attempt to enter without payment. As soon as a person is situated in the passage between the railing and the housing in front of the cell C2, this cell places the relay R2 in operation. The latter in turn places in the circuit the cell C3 which is at a given potential and which during movement of the individual places the relay R3 in operation so as to release the alarm which thus raises the non-solid barrier to close the latter and to indicate an attempt to pass through without payment. The alarm is terminated either by a return to the rear of the fraudulent person or by making the payment, either by way of an interrupter button (EA) placed at the door of surveillance provided at the entry and being present for this purpose.

In carrying out the present invention, the mounting of the electronic elements (rectifiers, diodes, transistors, resistors and capacitors) is provided on removable plates in the form of a printed circuit which permits the operator to locate very quickly any given panel and to proceed to continue with the operations replacing any faulty plate by a new plate. A permanent supply of these plates with the printed circuits can be provided to avoid any prolonged interruption of the operation of the apparatus and to permit a rapid repair thereof.

Figures 9, 10:
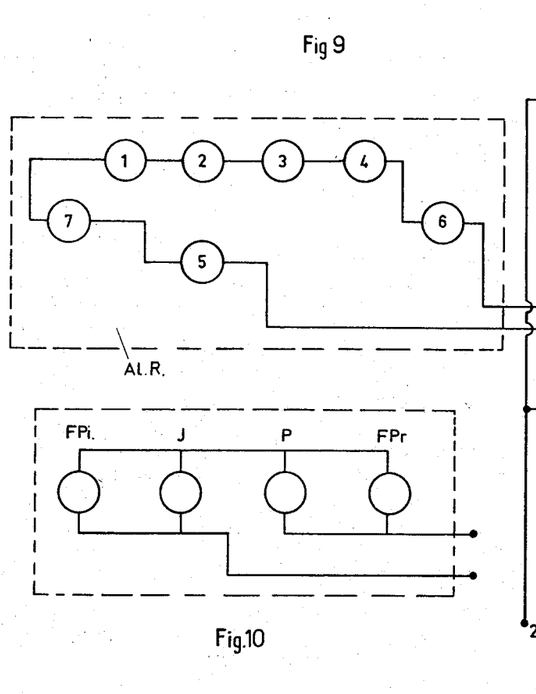
FIG. 9 schematically illustrates the electrical supply of power for the various units including the cells, the motors for distributing the billets, and also FIG. 9 schematically illustrates the supply for the relays, transistors and electromagnetic controls for the openings for the money and tokens.
FIG. 10 is a schematic electrical diagram of the sign of instructions for admission with various lamps making visible the coin indications, the price indications, the place where tokens are to be received, the place where money is to be received, and the price of the seats.

Referring to FIG. 9, it will be noted that the envelopes of the cells are seven in number and are supplied with power from a safety box with a transformer connected to the general supply of power which may be 220 volts or 127 volts, the power being supplied across a fuse and a circuit breaker. The transformer box thus supplies the cells by way of the lines I and II, designated A1 Amp C, the motor of the ticket-distributing means being supplied by the lines III and IV, indicated (A1 M D–B) and supplying the signals at the front face by way of the lines V and VI connected to the table of instructions at the entry side (TSE).

On the other hand, referring to FIG. 9, the transistor relays, and the electromagnets thereof, are supplied by relay power lines designated (A1 R), transistor supply lines (A1 Tr), electromagnet supply (A1 A), these extending from the safety box supplied itself by the 220 volts supply line through the fuse F. The safety box is grounded.

Referring to FIG. 10 which shows schematically a sign of instructions at the entry side (TSE) it will be noted that the different indications are visible for four cells, one cell or envelope being designated FPI and indicating the number of coins, a cell or envelope (J) indicating the use of tokens for entry, a cell P indicating the use of money for payment of admission, and a further cell indicating the price of admission (FPr).

The invention is not limited to the particular features described above. It is, on the contrary, capable of variations and modifications which will be obvious to those skilled in the art.

It is therefore apparent that with the structure of the invention an automatic apparatus is provided for controlling admission with prepayment or with right of entry into public places, such as theaters, which require a price of admission.

The apparatus of the invention provides considerable improvements with reference to known systems while suppressing all types of solid barriers and at the same time compelling the spectators to make the payment for the right of admission, the controls being provided without any possible error.

The apparatus of the invention provides a considerable reduction in the cost of the operation of a theater or the like, while improving the conditions under which the controls are made, as well as the accounting and the admission, without imposing any additional constraints on the operators. Means are provided in the apparatus of the invention to enable the spectators to admit themselves without any visual or manual control and to choose at their own convenience those places which suit them best for viewing the spectacle. The apparatus includes means to enable the spectators to depart from the theater at any moment, particularly during intermissions and to again be readmitted without any payment.

The lack of any solid barrier is of particular significance since it will not produce any restraint on clothing, particularly of feminine spectators, so that the clothing of ladies cannot be damaged in any way. Furthermore, the device of the invention requires only a single connection to a source of power and does not require any additional accessories to render it operable. Furthermore, it is possible to easily displace the apparatus to any desired location in the theater. Because there is no solid barrier to movement of the individuals, there will be resistance to advance of a continuous file of spectators who seek entry into the theater. This is of particular importance since the device of the invention provides absolutely no obstacle to rapid evacuation when necessary, so that the theater can be emptied without hindrance since the passage for going and coming is without any material obstacle of any type.

With the apparatus of the invention it is possible for individuals of considerable corpulence as well as for excessively thin individuals to pass through the admission passage without any difficulty, while at the same time preventing attempts for two individuals to pass through for the payment of one individual in the event that two relatively thin individuals situated themselves next to each other so as to attempt to treat the machine as if they are a single individual. In order to avoid a fraud of this latter type the informer structure provided by the lower set of infra-red lamps and cells, counts the number of feet. During such an operation when a predetermined number of feet, 3 or 4, for example, is sensed, the alarm is released.

What is claimed is:

1. Apparatus for automatically controlling admission to a public place where prepayment of a price of admission is required to obtain the right of admission, comprising, in combination:
   (a) a housing;
   (b) money handling means in said housing for collecting and counting money introduced in said housing, for giving change to counted money introduced in said housing in excess of said price, and for collecting tokens;
   (c) ticket distributing means in said housing for discharging tickets from said housing;
   (d) token distributing means in said housing for discharging tokens from said housing;
   (e) alarm means for giving an alarm;
   (f) sensing means for sensing the passing of a person past said housing; and
   (g) electronic means connecting said money handling means, ticket distributing means, token distributing means, alarm means, and sensing means for discharge of a ticket by said ticket distributing in response to the collecting of a predetermined amount of money by said money handling means, for inactivating said alarm means in response to the collecting of said predetermined amount of money or of a token by said money handling means, for energizing said alarm means in response to the sensed passing of a person in one direction when said alarm means are not inactivated, and for discharging a token from said token distributing means in response to the sensed passing of a person in a direction opposite to said one direction.

2. The combination of claim 1, wherein said ticket distribution means include means for removing a tab from each ticket when the same is being discharged from said housing and for collecting the removed tab.

3. The combination of claim 1, wherein said electronic means include a coin-actuated switch, and said money handling means include means for directing a coin introduced in said housing toward said switch.

4. The combination of claim 1, further comprising transporting means operatively connected with said housing for providing for movement thereof to a selected location, and slidable rail means operatively connected to said housing to define therewith a passage for said passing of a person, said sensing means being located adjacent said passage.

5. The combination of claim 2, wherein said ticket distributing means include a plurality of cutting blades, a pair of motors which simultaneously actuate said cutting blades for cutting tubs from the tickets, for separating the tickets one from the other, and for finally discharging each ticket, the tickets, prior to being separated, being arranged in a head-to-foot arrangement with two tabs of a pair of successive tickets situated next to each other between the pair of tickets.

6. The combination of claim 1, wherein said sensing means include a group of photoelectric cells and a plurality of infrared lamps respectively aligned with said photosensitive resistors, said lamps and said cells jointly defining a passage for said passing of a person past said housing.

References Cited

UNITED STATES PATENTS

| | | |
|---|---|---|
| 2,769,165 | 10/1959 | Bower. |
| 3,112,019 | 11/1963 | Simjian _____________ 194—2 |
| 3,215,240 | 11/1965 | Keim et al. __________ 194—2 |

STANLEY H. TOLLBERG, *Primary Examiner.*